United States Patent [19]

Kozai

[11] Patent Number: 4,505,560
[45] Date of Patent: Mar. 19, 1985

[54] CAMERA BACK
[75] Inventor: Katsuya Kozai, Tokyo, Japan
[73] Assignee: Fuji Photo Film Co., Ltd., Kanagawa, Japan
[21] Appl. No.: 544,911
[22] Filed: Oct. 24, 1983
[30] Foreign Application Priority Data Oct. 22, 1982 [JP] Japan ................................. 57-185414

[51] Int. Cl.³ ...................... G03B 17/50; G03B 19/10; G03B 9/02
[52] U.S. Cl. ...................................... 354/86; 354/181; 354/304
[58] Field of Search ............... 354/177, 180, 181, 182, 354/304, 83, 84, 85, 86

[56] References Cited
U.S. PATENT DOCUMENTS 4,107,710 8/1978 Harvey .................................... 354/86
4,460,254 7/1984 Hara et al. ............................. 354/86

Primary Examiner—John Gonzales
Assistant Examiner—Douglas S. Lee
Attorney, Agent, or Firm—Sughrue, Mion, Zinn, Macpeak and Seas

[57] ABSTRACT

A camera back adapted to be fitted on the back of a camera or the like has a frame for a film container pivotally mounted in the housing of the camera back for movement between the first picture taking position and a second film discharge position. A pair of processing solution spreading rollers are rotatably mounted at the top of the frame with the nip region thereof being aligned with a discharge slot in the camera back housing when the frame is in the second position. An electric motor is mounted in the housing for rotating the rollers in opposite directions through suitable gearing. An endless belt having a first outwardly directed projection and a second inwardly directed projection is entrained about a pair of pulleys in the housing, one of which is driven by the motor. An L-shaped lever is pivoted in the housing with one arm connected to the frame and the other arm having a pin adapted to be engaged by the second inwardly extending projection on the belt for pivoting the lever and the frame between the first and second positions. A slide plate having a pawl for engaging the top film in a film pack is adapted to be raised by engagement with the first outwardly extending projection for lifting the film into engagement with the rollers after the frame has been moved to the discharge position.

4 Claims, 6 Drawing Figures

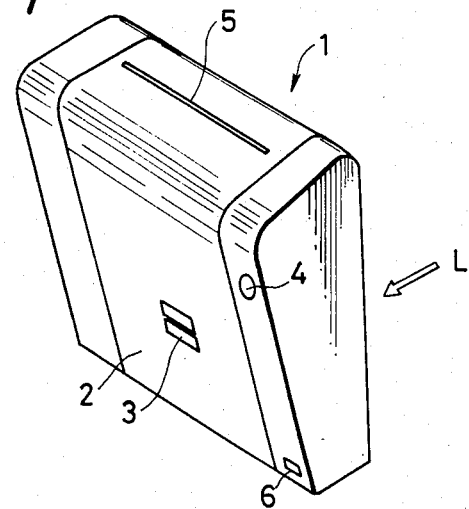
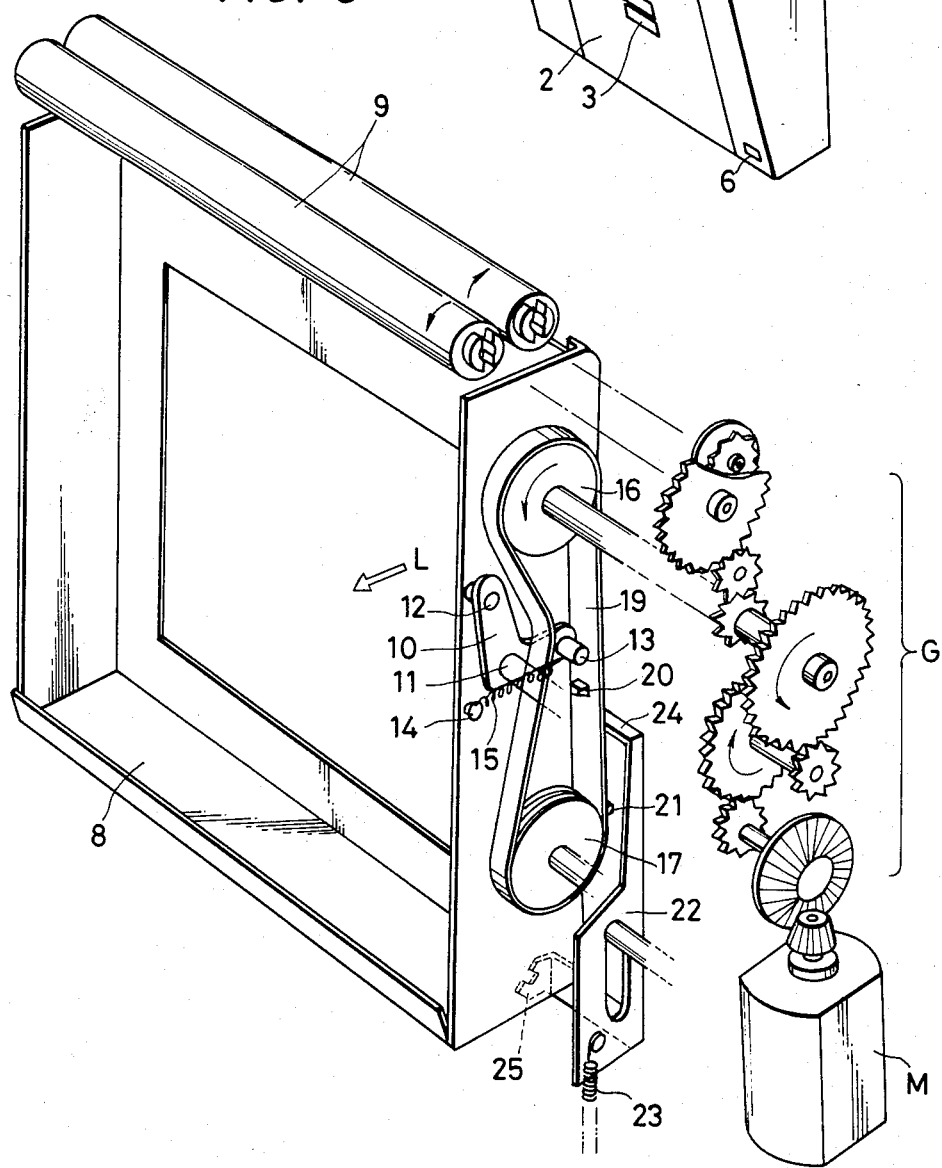

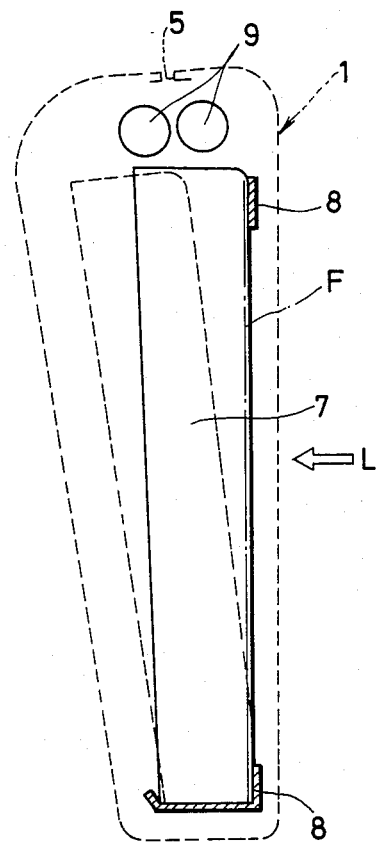
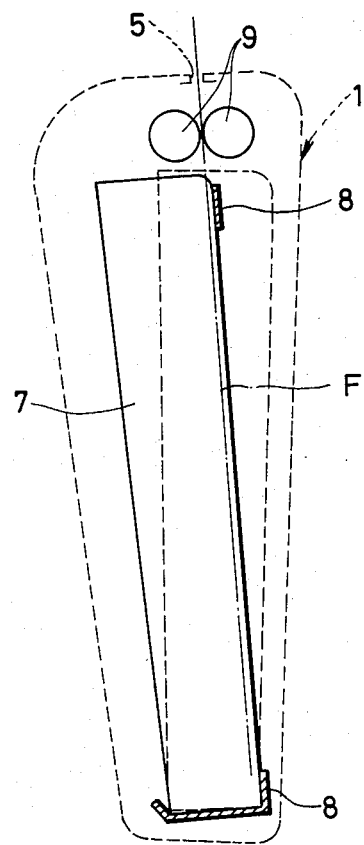

CAMERA BACK

BACKGROUND OF THE INVENTION

The present invention relates to a camera back which is adapted to be mounted on a variety of cameras or optical devices and more specifically to a camera back adapted to hold self-developing type film and having means for discharging the film automatically upon taking a picture.

A camera back loaded with self-developing type films is well known in the art and is adapted to be mounted on large cameras such as press cameras and view cameras, microscope photographing devices or oscilloscope photographing devices. Self-developing type films are divided into two groups. In the first group, after exposure the film is caused to pass through the processing solution spreading means by pulling its leader and after a predetermined period of time the light shielding cover or the like is removed to obtain a visible picture. In the second group, after exposure the film is automatically discharged out of the photographing device through the processing solution spreading means. That is, in the second group, the developing treatment is automatically carried out and a part such as a light shielding cover to be removed after exposure is not employed. For such a camera back to be applicable to as many cameras or optical devices (hereinafter referred to as "photographing devices", when applicable) as possible, the distance between the mounting surface of the camera back by which the camera back is mounted on the photographing device and the film surface is short, and that, in order for the film surface of the camera back to be exactly positioned as the film surface of the photographing device, the camera back is mounted on the photographing device through an adaptor provided therefor. Furthermore, in order to improve the applicability of the camera back to a variety of photographing devices, it is essential that the mounting surface of the camera back has no protrusion, because the protrusion limits the photographing devices to which the camera back is applicable.

In the case of the camera back using the above-described films with leaders, the film is passed through the processing solution spreading means by pulling the leader. Accordingly, in this case, the positional relationship between the film surface and the processing solution spreading means is not strict, and the applicability of the camera back to a variety of photographing devices can be readily obtained. On the other hand, in the case of the camera back using the films which have no leaders, the exposed film is pushed into a processing solution spreading means, such as a pair of rollers driven by a motor, through a discharging slit formed in the film container by a pawl-shaped member which is adapted to enter into a narrow groove having a predetermined length cut in the front surface of the film container to thereby push the film towards the discharging slit, so that the film is discharged out of the camera back while being processed by the processing solution. Accordingly, in this case, the distance between the discharging slit of the film container and the processing solution spreading rollers must be shorter than the distance of movement (the length of the narrow groove in maximum) of the pawl-shaped member. In addition, the surface of a film which is at the photographing position, the discharging slit of the film container and the processing solution spreading means which might be the nipping region of the pair of processing solution spreading rollers must be substantially in one plane. Accordingly, it is considerably difficult to make the camera back applicable to a variety of photographing devices or the like.

SUMMARY OF THE INVENTION

An object of this invention is to provide a camera back using self-developing films without leaders in which the film container is moved before and after exposure, to improve the applicability thereof to a variety of photographing devices or the like.

A further object of this invention is to provide a camera back having a housing with a film discharge slot in the top thereof, a frame for a film container pivotally mounted in said housing adjacent the bottom thereof between a first picture taking position and a second film discharge position, a pair of processing solution spreading rollers rotatably mounted at the top of said frame with the nip region thereof being aligned with said slot when said frame is in said second position and motor driven means mounted in said housing for rotating said rollers, moving said frame from said first position to said second position, feeding a film to said rollers when said frame is in said second position and moving said frame from said second position back to said first position.

The foregoing and other objects, features and advantages of the invention will be apparent from the following more particular description of a preferred embodiment of the invention as illustrated in the accompanying drawings.

BRIEF DESCRIPTION OF THE DRAWINGS

FIG. 1 is a perspective view showing the rear of a camera back according to the invention.

FIGS. 2 and 3 are vertical sectional views of the camera back.

FIG. 6 is a perspective view showing the rear of the camera back for a description of the drive system.

DETAILED DESCRIPTION OF THE INVENTION

Figure 4:
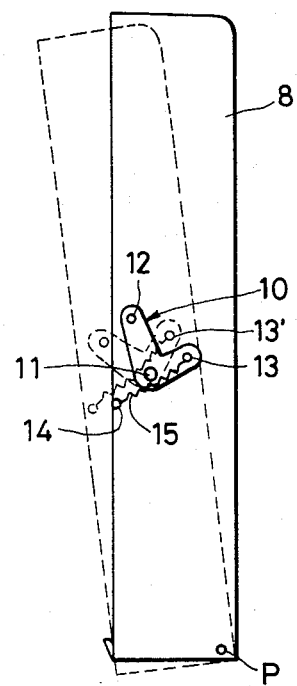
FIGS. 4 and 5 are side views of the interior of the camera back, showing one example of a driving system therefor.

One preferred embodiment of this invention will be described with reference to the accompanying drawings. FIG. 1 is a perspective view of a camera back of the invention as viewed from behind. The camera back 1 has an opening for receiving light which comes from an object as indicated by the arrow L, and is mounted optically tight on a photographing device or the like by any suitable means (not shown). The camera back 1 has a rear cover 2 on the rear surface, which is coupled by means of a knob 3 in order to load a film container containing self-processing type films. A light beam L from an object, coming through the shutter of a photographing device or the like, is applied through the opening of the camera back and the exposure opening of the film container to the top film. When a button 4 is depressed, the top film is discharged through a discharging slit 5 provided on the top of the camera back while being processed. Thus, a visible picture can be obtained immediately. In FIG. 1, reference numeral 6 designates a counter which indicates the number of films remaining in the film container or the number of films which have been photographed.

FIGS. 2 and 3 are sectional side views outlining the camera back. The camera back 1 incorporates a moveable frame 8 adapted to support a film container 7 which is loaded therein. The film container 7 is fixedly secured to the frame 8 by any suitable means (not shown). At the time of exposure, the frame 8 and the film container 7 are positioned as indicated by the solid line in FIG. 2 and accordingly, the top film is at a position F in FIG. 2. The nip of the processing solution spreading rollers is not in alignment with the position F, but is displaced inwardly of the camera back. After exposure, the frame 8 is turned about the lower edge so that the film container 7 comes to a position indicated by the dotted line. As a result, the extension of the top film (at the position F) in the film container 7 aligns with the nip region of the pair of processing solution spreading rollers 9 as shown in FIG. 3. When, under this condition, the button 4 is depressed, the top film is pushed out of the film container and is discharged out of the camera back while being passed through the rollers 9 similar to a conventional self-processing type camera. Employment of the above-described structure can solve, without any protrusions on the right wall (which is a mounting surface for mounting the camera back on a photographing device or the like) of the camera back 1 as viewed in FIG. 2, the difficult problem of positioning the processing solution spreading rollers in alignment with the film at the top position F.

One example of the mechanism for turning the frame 8 will be described. As shown in FIG. 4, the frame 8 is pivotally mounted on the camera back through a shaft P provided at the lower end thereof. An L-shaped lever 10 is provided on one side of the frame 8, and its central shaft 11 is fixedly secured to the camera back 1. A shaft 12, rotatably embedded in one end portion of the L-shaped lever 10, is fixedly secured to the frame 8. A pin 13 embedded in the other end portion of the lever 10 is coupled to a pin 14 embedded in the frame 8 through a tension spring 15 which extends between the frame 8 and the lever 10. The lever 10 has two stable positions indicated by the solid line and the dotted line in FIG. 4 owing to the action of the spring 15. The frame 8 is turned about the shaft P so as to selectively take one of these positions. When the lever 10 is at the position indicated by the solid line, the frame 8 sets the film container 7 at the photographing position; and when the lever 10 is at the position indicated by the dotted line, the frame 8 set the film container 7 at the film discharging position. Depending on the position of the frame 8, the spring 15 tends to turn the frame 8 clockwise or counterclockwise. Therefore, a stopper should be provided for the frame so that the film container is stopped exactly at the above-described two positions.

Figure 5:
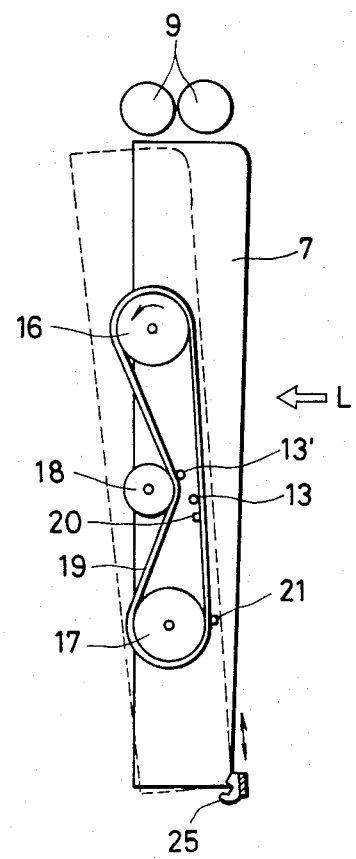

A method of driving the L-shaped lever 10 will be described. As shown in FIG. 5, an endless belt 19 is laid over three pulleys 16, 17, and 18, which are provided on one side of the frame and are pivotally mounted on the camera back body. The positional relationship between the endless belt 19 and the pin 13 on the L-shaped lever 10 is as shown in FIG. 5 (the position of the pin being indicated at 13 when the film container is at the photographing position, and 13' when it is at the film discharging position). A protrusion 20 is formed on the inner surface of the endless belt, and a protrusion 21 is formed on the outer surface of the endless belt. The positions 13 and 13' of the pin are on the loci of the protrusion 20 which are described when the latter is moved upwardly and downwardly, respectively. It goes without saying that grooves for clearing the protrusion 20 are cut in the cylindrical walls of the pulleys 16 and 17, and a groove for clearing the protrusion 21 is cut in the cylindrical wall of the pulley 18.

As shown in a perspective view in FIG. 6, the pulley 16 and the processing solution spreading rollers 9 and 9 are simultaneously driven by a motor M and a gear train G. For convenience in understanding, the motor M is shown separated from the gear train G and the pulley 18 is not shown in FIG. 6.

A slide plate 22 which slides up and down along the camera back body is provided near the pulley 17. The slide plate 22 is pulled downwardly by a spring 23. The upper protion 24 of the slide plate 22 is on the locus of the protrusion 31 of the endless belt 19, and a pawl-shaped member 25 is extended from the lower portion of the slide plate 22. The pawl-shaped member 25 is inserted through a slit formed in the lower end of the frame 8 into a narrow groove having a predetermined length which is cut in the front surface of the film container (not shown in FIG. 6) helf by the frame 8, so as to engage with the rear edge of the film at the top position.

The camera back is constructed as described above. When the film container 7 held by the frame 8 is positioned as indicated by the solid line in FIG. 2, a light beam from an object is applied to the film at the top position F in the film container 7. Upon depression of the button on the rear surface of the camera back, the motor M is driven to turn the pair of processing solution spreading rollers 9 and 9 in the directions of the arrows and simultaneously to turn the pulley 16 counterclockwise thereby to drive the endless belt 19. As a result, the protrusion 29 pushes up the pin 13. Therefore, the L-shaped lever 10 is turned counterclockwise about the shaft 11 against the elastic force of the spring 15 to the position as indicated by the dotted line in FIG. 4, while the frame 8 is also turned counterclockwise about the shaft P to the position as indicated by the solid line in FIG. 3. Thus, the lever 10 and the frame 8 are held stable in the solid position of FIG. 3. At the endless belt is further driven, the protrusion on the outer surface of the belt engages with the upper portion 24 of the slide plate 22 to lift the latter against the elastic force of the spring 23. In this operation, the pawl-shaped member 25 engages the rear edge of the top film which has been exposed, to lift the top film, so that the top film is discharged out of the film container 7 through the discharging slit provided at the upper end of the container 7 and is delivered to the nipping region of the processing solution spreading rollers 9 and 9. Further, when the slide plate 22 reaches an upper limit of travel, the protrusion 21 disengages from the upper portion 24 of the slide plate 22 and therefore, the plate 22 is returned to its original position by the elastic force of the spring 23. As the rollers 9 and 9 are turned, the film is moved upwardly while the processing solution container at the front end of the film is ruptured and the processing solution is spread between the layers in the film in the conventional manner. Finally, the film is discharged out of the camera back through the slit 5 at the upper end of the camera back. As the endless belt 19 is further driven, the protrusion 20 goes around the pulley 16 to push down the pin 13 which is located at the position 13'. As a result, the L-shaped lever 10 positioned as indicated by the dotted line in FIG. 4 is returned against the spring 15 to take the position indicated by the solid line, and accordingly, the film container is returned from the position indicated by the solid line in FIG. 3 to the position indicated by the solid line in FIG. 2. At the same time, the frame 8 takes the initial photographing position, so as to be ready for the next exposure. The motor M is stopped when the protrusion 20 of the endless belt 19 has returned to its start position (the switching mechanism thereof not being shown).

As the camera back is constructed as described above, the film container can be automatically reciprocated between the photographing position and the film discharging position. While the invention has been described with reference to its preferred embodiment shown in FIGS. 4, 5 and 6, it should be noted that the invention is not limited thereto or thereby. That is, the embodiment may be notified in various manners. For instance, the camera back may be manually operated from the outside so that the film container takes the positions shown in FIGS. 2 and 3. This is the simplest driving method. Alternately, the method of turning the film container may be replaced by a method of moving the film container along the optical axis.

Furthermore, the above-described embodiment may be so modified that, as the rear cover 2 is opened, the frame is automatically positioned as indicated by the solid line in FIG. 3 so as to facilitate loading and unloading of the film container.

As is apparent from the above description, according to the invention the front surface of the camera back (by which the camera back is mounted on a photographing device or the like) is substantially flat, and the film surface is brought to the front surface of the camera back. Accordingly, applicability of the camera back to a variety of photographing devices has been remarkably improved.

While the invention has been particularly shown and described with reference to a preferred embodiment thereof, it will be understood by those in the art that the foregoing and other changes in form and details may be made therein without departing from the spirit and scope of the invention.

What is claimed is:

1. A camera back having a housing with a film discharge slot in the top thereof, a frame for a film container pivotally mounted in said housing adjacent the bottom thereof between a first picture taking position and a second film discharging position, a pair of processing solution spreading rollers rotatably mounted at the top of said frame with the nip region thereof being aligned with said slot when said frame is in said second position, and motor driven means mounted in said housing for rotating said rollers, moving said frame from said first position to said second position, feeding a film to said rollers when said frame is in said second position, and moving said frame from said second position back to said first position.

2. A camera back as set forth in claim 1 wherein said housing is provided with a light receiving aperture in one side thereof and said frame is disposed in engagement with said one side of said housing when said frame is in said first picture taking position.

3. A camera backing as set forth in claim 1 wherein said motor driven means is comprised of a motor, gear means operatively connected between said motor and said rollers for rotating said rollers in opposite directions, pulley means rotatably mounted in said housing and driven by said motor, an endless belt entrained about said pulley means having a first outwardly directed projection thereon and a second inwardly directed projection thereon, an L-shaped lever pivotally mounted in said housing, means connecting one arm of said lever to said frame, a pin projecting from said other arm of said lever for engagement by said second inwardly extending projection on said endless belt for pivoting said lever and said frame between said first and second positions, and overcenter spring means connected to said lever for maintaining said lever and said frame in said first and second positions.

4. A camera back as set forth in claim 3 further comprising a slide plate guided for limited vertical reciprocatory movement in said housing, a lateral projection on the upper end of said slide plate disposed in alignment with said first outwardly extending projection of said endless belt for raising said slide plate, laterally extending pawl means connected to the lower end of said slide plate for engaging and lifting a film in said frame upwardly into the nip region of said rollers and spring means for biasing said slide plate downwardly.

* * * * *